United States Patent [19]

Thornton et al.

[11] Patent Number: 4,636,231

[45] Date of Patent: Jan. 13, 1987

[54] PANEL AIR FILTER

[75] Inventors: Donald I. Thornton, Warwick, R.I.; Richard H. Peyton, Berkley, Mass.; James P. O'Shea, East Providence, R.I.

[73] Assignee: Allied Corporation, Morristown, N.J.

[21] Appl. No.: 765,783

[22] Filed: Aug. 15, 1985

[51] Int. Cl.[4] .............................................. B01D 27/06
[52] U.S. Cl. ........................................ 55/318; 55/486; 55/497; 55/521; 55/526; 55/528; 55/DIG. 5; 156/167; 210/491; 210/496; 264/DIG. 48
[58] Field of Search .................... 55/DIG. 5, 486, 487, 55/497, 521, 526, 528, 318, 323; 156/167; 210/491, 496, 508; 264/48, 122, DIG. 48

[56] References Cited

U.S. PATENT DOCUMENTS

| 2,576,864 | 11/1951 | Valente | 55/DIG. 5 X |
| 3,003,643 | 10/1961 | Thomas | 210/491 |
| 3,073,735 | 1/1963 | Till et al. | 156/38 |
| 3,251,475 | 5/1966 | Till et al. | 210/508 |
| 3,261,473 | 7/1966 | Riede | 210/282 |
| 3,347,391 | 10/1967 | Steensen | 210/491 |
| 3,686,837 | 9/1972 | Hopkins et al. | 55/487 |
| 4,047,914 | 9/1977 | Hansen et al. | 55/528 X |
| 4,133,661 | 1/1979 | Strand | 55/497 |
| 4,236,901 | 12/1980 | Kato et al. | 55/497 X |
| 4,268,289 | 5/1981 | Polaner | 55/486 |

FOREIGN PATENT DOCUMENTS

| 0693390 | 7/1940 | Fed. Rep. of Germany | 55/497 |
| 2061174 | 9/1980 | United Kingdom . | |

Primary Examiner—Charles Hart
Attorney, Agent, or Firm—Ken C. Decker; William N. Antonis

[57] ABSTRACT

A filter element and method for making it include the steps of providing a pleated paper filtering media and providing a batt-like filtering media containing thermoplastic fibers which is slightly larger than the pleated paper filtering media. A ring-shaped die is used in a press to apply heat and pressure to the edges of the batt-like filtering media while accommodating the rest of the batt-like filtering media in the aperture of the die. Accordingly, a stiffened wall is provided which circumscribes the pleated paper filtering media. The pleated paper filtering media is attached to the stiffened, fluid-impermeable wall to provide a fluid-impermeable seal therebetween. A perimetrically-extending flange gasket is simultaneously formed around the edge of the batt-like media, so that the latter can be sealingly engaged in an air cleaner housing.

14 Claims, 6 Drawing Figures

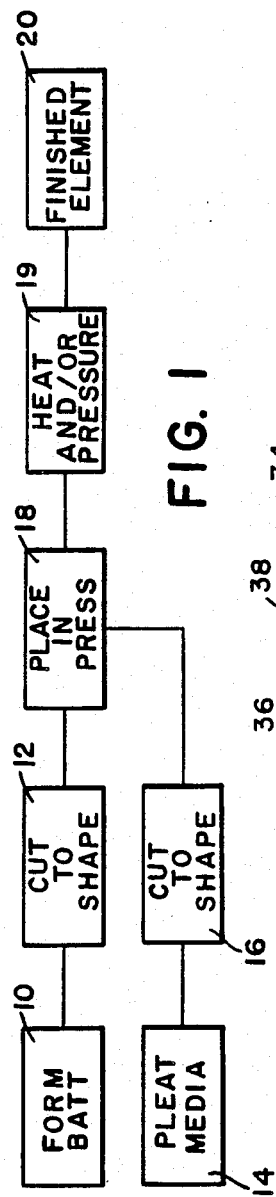
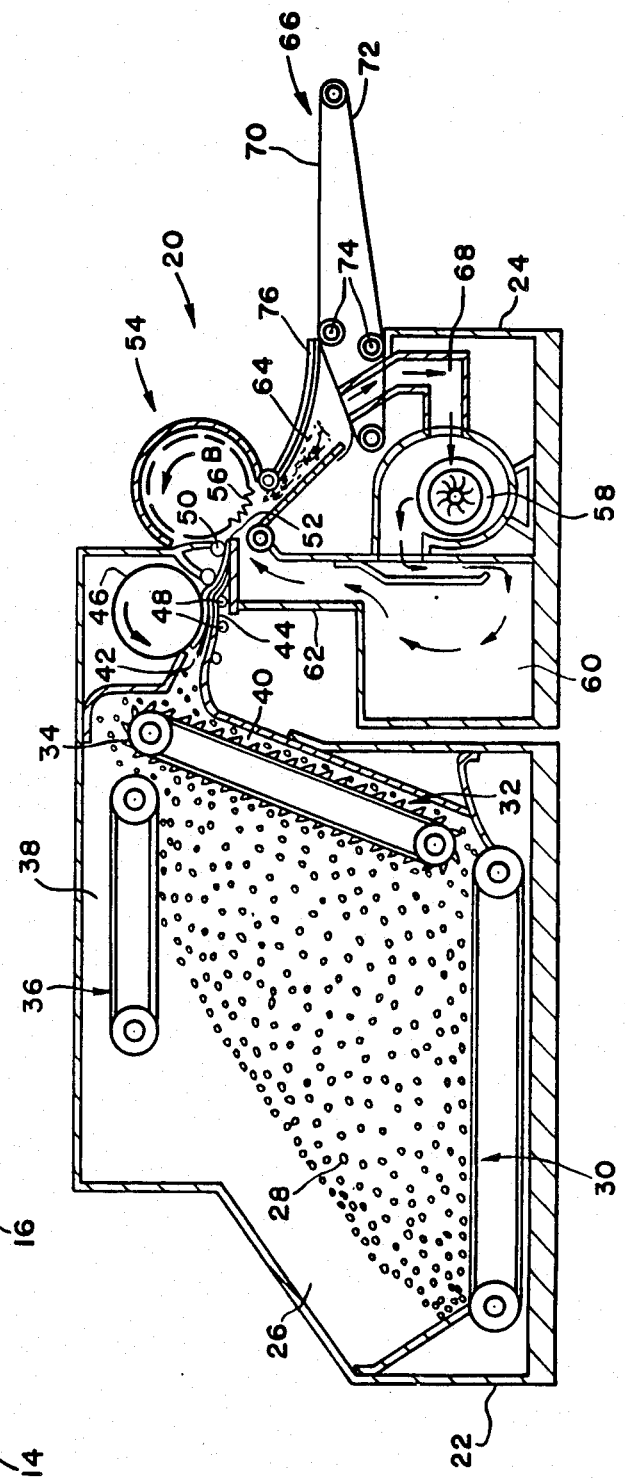

PANEL AIR FILTER

This invention relates to a molded panel filter element and a method for its manufacture.

Fluid filters, particularly those used to filter inlet air for an internal combustion engine, normally require several different components and are relatively expensive to manufacture, not only because of the number of components required, but also because of the labor necessary to assemble these components. For example, most inlet air filters are cylindrical, pleated paper elements, which are circumscribed by inner and outer support screens and which carry upper and lower seals. The seals must be molded onto the filter element, which requires setting and stripping of the sealant material from the dies. Another type of air filter which is in common use is the so-called panel air filter, which consists of a panel of pleated paper which carries the necessary seals, sidewalls, etc. Both of these types of filters are normally single stage filters, although more recently dual media air cleaners of both types have been produced.

The present invention is a molded panel air filter of the dual media type which is very inexpensive to produce, since it eliminates many of the separate supports, seals, screens, etc., which were necessary with prior art filters. The air filter of the present invention requires only two components. One of these components is a section of a nonwoven batt consisting of randomly arrayed thermoplastic fibers combined with other fibers which are not thermoplastic, or a batt made from fibers which are not thermoplastic which is impregnated with a thermoset binder. When both heat and pressure are applied to the batt, the fibers fuse. Accordingly, if sufficient heat and pressure are used, the fibers in a portion of the batt can be fused together to make a substantially fluid-impermeable wall, while the remainder of the batt retains its open characteristic permitting fluid flow therethrough. Even though a portion of the batt is fused into a fluid-impermeable wall, the wall can be designed so that it retains some resiliency, thereby permitting a portion of the wall to act as a gasket when the panel air filter element according to the invention is placed in an engine air cleaner. Accordingly, the steps of providing a separate gasket are eliminated from the manufacture of this filter.

These and other advantages of the present invention will become apparent from the following description with reference to the accompanying drawings, in which:

FIG. 1 is a block diagram diagrammatically illustrating the manufacturing steps used in the manufacture of a fluid filter pursuant to the teachings of the present invention;

FIG. 2 is a cross sectional illustration of the machine used to manufacture the batt material used in our panel air filter;

Figure 3:
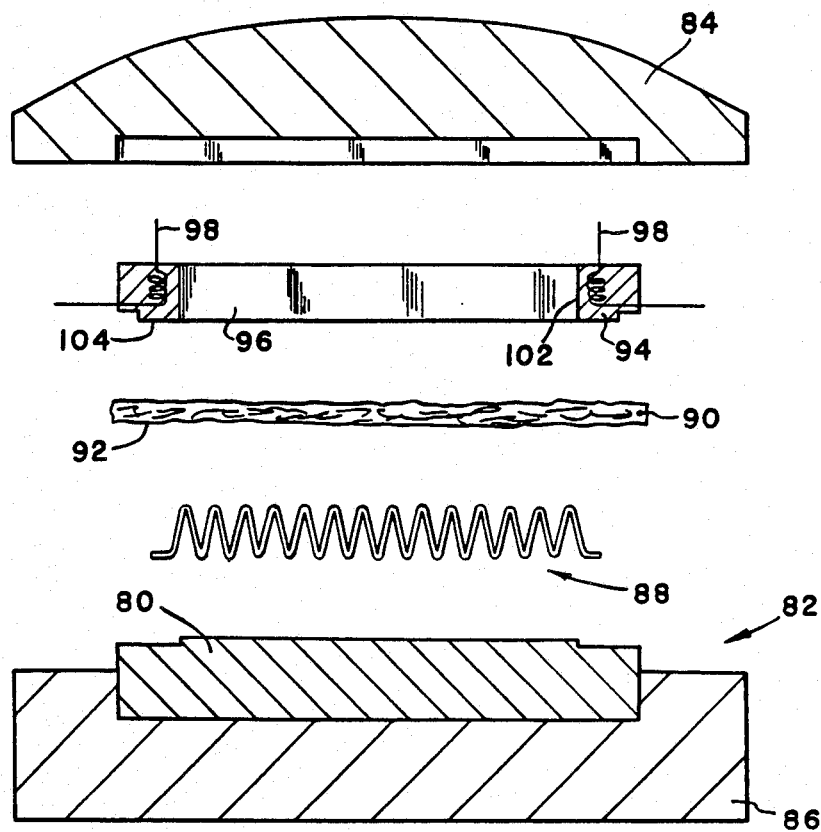
FIG. 3 is an exploded illustration of the filtering media used in the present invention, along with the dies used to form the filter.

Referring now to FIG. 1, the fluid filter made pursuant to the teaching of the present invention is made by first forming a nonwoven batt as indicated in block 10. The batt is formed by the machine illustrated in FIG. 2 as will be described hereinafter. A section of the batt is cut to shape as indicated in block 12. At the same time, a second filter media is pleated as indicated by the block 14. The pleated media may be either a treated filtering paper or a batt which is sufficiently dense to be pleated. The media is pleated in the normal manner by using pleating rolls (not shown), as is well known to those skilled in the art. The pleated batt has the advantage, as will be discussed hereinafter, of being compatible with the first filtering media, so it may be assembled without use of an adhesive as will be hereinafter described. Regardless, the pleated media formed in block 14 is cut to shape as indicated in block 16, and then both filtering media are placed in a press along with the heated die and platen as illustrated in FIG. 3. This is illustrated by block 18 in FIG. 1. Heat and then pressure are then applied to a portion of the first media as indicated in block 19, to thereby make a portion of the first media more rigid, to form an air-impermeable wall which the second media is sealed against. The finished product is then removed from the die as illustrated in block 20.

As illustrated in FIG. 2, an air laid nonwoven batt formation machine generally indicated by the numeral 20, of the type available commercially from the Rando Machine Corporation and generally illustrated in U.S. Pat. No. 3,918,126, includes two relatively large housings 22, 24. The housing 22 includes a relatively large hopper 26 which receives a fiber mixture generally indicated by the numeral 28. The fiber mixture 28 includes both thermoplastic fibers, such as vinyl fibers or fibers made from a thermal setting resin and fibers which are not thermoplastic, such as, for example, wood pulp fibers or textile fibers. Although a wide range of the relative quantities of the different types of fibers is possible, it has been found that a mixture of about 30% thermoplastic fibers and the rest non-thermoplastic fibers achieves satisfactory results. A conveying apron 30 is operated by an appropriate power source (not shown) to move the fibers 28 to the right, viewing FIG. 2, toward an elevating apron generally indicated by the numeral 32. The elevating apron 32 is provided with spikes 34 so that the apron 32 conveys the fibers upwardly, viewing FIG. 1. A stripper apron generally indicated by the numeral 36 is mounted in the upper part of the hopper 26, viewing FIG. 2. A blower (not shown) provides metered air flow through the channel 38 defined between the upper race of the apron 36 and the corresponding portion of the housing 22. The metered air flow through the channel 38 removes fibers at a predetermined rate from the elevating apron 32. The remaining fibers are returned to the hopper 26 through the channel 40. The metered air flow passing through the channel 38 forces the other fibers into a duct 42. The air flow through the duct 42 enters a porous condensor screen 46 which is rotated in the direction indicated by the arrow A. The feed mat 44 is formed between the screen 46 and mechanical rolls 48. The feed mat 44 is transferred by the mechanical rolls 48 to a feed roll 50 and is then passed over a conventional serrated nose bar 52. The fibers are brushed off the nose bar 52 by a conventional lickerin generally indicated by the numeral 54. The lickerin 54 is provided with a serrated surface defining spikes or teeth 56 across the entire width and around the circumference of the lickerin 54. The lickerin 54 is powered for rotation as indicated by the arrow B in FIG. 2.

The fibers are doffed from the lickerin 54 by the centrifugal forces generated by the rotating speed of the lickerin 54 and also by air flow provided by a blower 58. The blower 58 blows air into a chamber 60 defined within the housing 24. The air flow from the blower 58 is guided through a duct 62, around a portion of the surface of the lickerin 54, and into a duct 64. The fibers are removed from the lickerin and are conveyed by the air stream from blower 58 through the duct 64 to a foraminous conveyor generally indicated by the numeral 66. The inlet of the blower 58 is connected to a duct 68 which communicates with the duct 64 through a foraminous belt 70 comprising a part of the conveyor 66. Since the belt 70 is porous and permits air flow therethrough, the blower 58 is capable of circulating air through the ducts 62, 64 and 68. The foraminous belt 70 is mounted on guide rollers 72 which are driven by an appropriate motor (not shown). The nonwoven web or mat is formed on the foraminous belt 70 which includes a portion 74 extending from the dust cover 76 to permit ready removal of the batt as it is formed. Accordingly, the completed batt can be removed from the foraminous belt 70.

As discussed hereinabove, a second filtering media, such as filter paper or a nonwoven batt that is of sufficient density that it can be pleated, is pleated in the normal way using pleating rolls (not shown). If a nonwoven densified batt is used, it is preferably of thermoplastic and non-thermoplastic fibers which are compatible with the fibers used in the first filtering media, as discussed hereinabove. In any event, a section of the pleated media is cut to the desired shape and placed on the lower platen 80 of a press generally indicated by the numeral 82. The press 82 includes an upper part 84 and a lower part 86 against which the upper part 84 closes. The platen 80 is a part of the lower portion 86 of the press, viewing FIG. 3. The section of pleated paper media is indicated by the reference numeral 88 in the drawing. A section of the batt produced by the machine illustrated in FIG. 2 is also cut to shape and is indicated by the numeral 90 in FIG. 3. As indicated in FIG. 3, the section 90 of the batt includes an edge portion 92 that projects beyond each of the four sides of the pleated media 88 when the batt section 90 is properly positioned upon the media 88.

The upper member 84 of the press 82 carries a ring-shaped die generally indicated by the numeral 94. The ring-shaped die 94 defines a central opening 96 which is substantially the same size of the cut-to-shape filtering media 88, and is somewhat smaller than the batt section 90 so that when the sections 84, 86 of the press 82 are closed together, the projecting portion or edge 92 of the batt section 90 will be engaged by the die 94, while the opening 96 will leave the rest of the batt section 90 unaffected by the die 94. The die 94 includes means, such as electric resistance heaters 98, to heat the die to a temperature sufficient to melt the thermoplastic fibers contained in the batt section 90. Accordingly, when the press 82 is closed, the heated ring-shaped die 94 will engage the edge 92 of the batt section 90, while accommodating the rest of the batt section 90 in the opening 96. As illustrated in FIG. 3, each of the sides of the ring-shaped die 94 is provided with a pair of mutually-perpendicular surfaces 102, 104. Accordingly, when the press 82 is closed, the surface 104 of the die 94 compresses a first section of the edge 92 of the batt section 90 against the lower platen 80, to thereby form a perimetrically-extending, peripheral flange on the batt section 90. The other mutually-perpendicular surface 102 engages a portion of the edge 92 inwardly of the portion engaged by the surface 104.

The portions of the edge 92 engaged by the heated die 94, of course, contain thermoplastic fibers which are softened and fused by the heat and pressure applied thereto by the die 94. By regulating the amount of heat and pressure applied, the edge portion 92 of the batt section 90 can be sufficiently stiffened so as to be impermeable to air flow. However, it is important that the amount of heat and pressure applied be regulated so that the portions engaged by the die 94 are not plasticized, thereby losing their resiliency. If this occurs, the projecting peripheral portion will be unusable as a gasket. As described hereinafter, it is the feature of the present invention that this peripheral flange, while being impermeable to fluid flow, nevertheless retains sufficient resiliency that it can be used as a gasket. Of course, the exact pressure and temperature parameters necessary vary over an extremely wide range, and are a function of the type of thermoplastic fiber used in the batt 90, the percentage of the batt 90 made up by thermoplastic fibers, and the relative relationship between the heat and pressure applied. In other words, a lower temperature can be used to achieve the same effect as a higher temperature if a greater pressure is used. These parameters are well within the skill of the art and must be determined for each particular material used.

Figure 4:
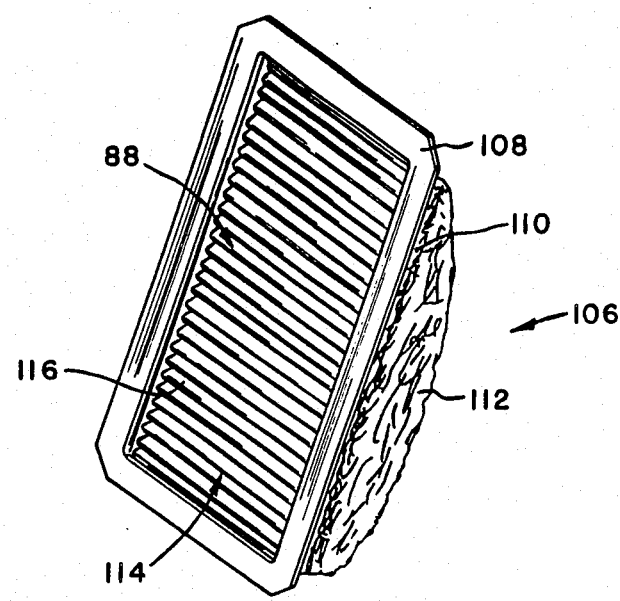
FIG. 4 is a perspective view of an air filter made pursuant to the teachings of the present invention.
Figure 5:
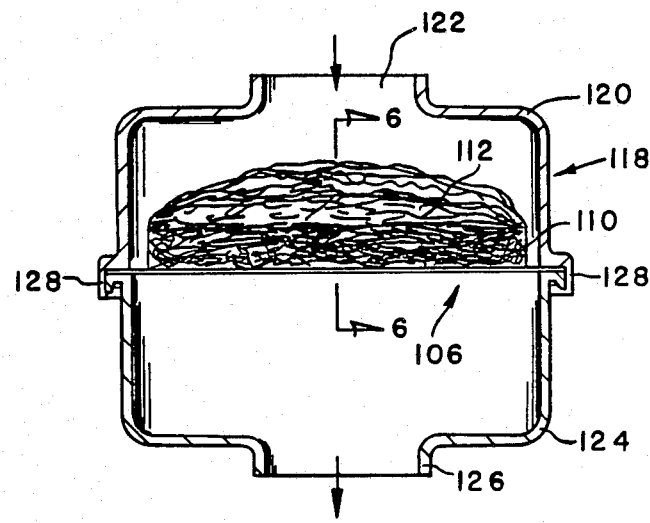
FIG. 5 is a cross sectional view of the panel filter illustrated in FIG. 4 installed in an air cleaner housing.
Figure 6:
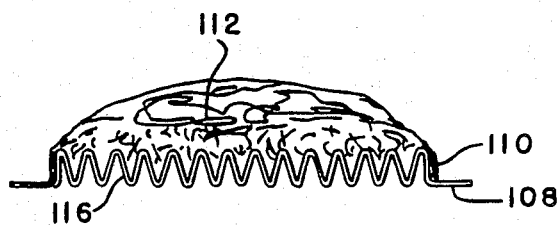
FIG. 6 is a view taken substantially along lines 6—6 of FIG. 5.

Referring now to FIGS. 4-6, the finished filter 106 includes a perimetrically-extending flange gasket 108, which was formed by the engagement of the surface 104 with the portion of the edge 92 against the platen 80. Similarly, the filter 106 further includes a wall 110 which extends all the way around the filter 106 and which was formed by the engagement with the surface 102 of the die 94 with the batt material 90. Both of these surfaces are stiffened sufficiently in the press 82 so as to be impermeable to fluid flow, but which retain sufficient resiliency as will be described hereinafter. The wall 110 cooperates with the rest of the batt section 90, which is indicated by the numeral 112, to define a recess generally indicated by the numeral 114 which receives the pleated filter media 88. Of course, the portion 112 of the filter 106 was the portion of the batt section 90 that was accommodated in the aperture 96 of the ring-shaped die 94. Accordingly, the portion 112 was neither stiffened nor otherwise affected by the die 94, and thus is still an open structure permeable to fluid flow. If the filtering media 88 was made out of a batt-like material containing fibers compatible with the fibers in the batt 90, the pressure and heat applied by the surface 102 of the ring-shaped die 94 fused the stiffened wall 110 to the ends of the pleats 116 of the pleated media 88. If instead the pleated media 88 is made up of a pleated paper, adhesive would have had to have been applied to the ends of the pleats in a well known manner before the pleated media 88 was installed in the press 82. The adhesive bonds the ends of the pleats to all portions of the wall 110 to provide a fluid-impermeable barrier therebetween.

Referring now to FIG. 5, the filter element 106 is illustrated as installed in an air cleaner housing generally indicated by the numeral 118. The air cleaner housing 118 includes an inlet portion 120 communicating with an inlet opening 122 which communicates the air stream to be filtered to the housing 118, and a lower section 124 which defines an outlet opening 126. Conventional circumferentially-spaced clamps 128 releasably hold the portions 120, 124 together. As illustrated in FIG. 6, the clamps 128 hold the mating portions of the sections 120, 124 against the flange 108. As described hereinabove, the flange 108 retains sufficient resiliency that, while it is fluid permeable, it may nevertheless be penetrated to a small degree by the ends of the sections 120, 124 to thereby effect a fluid-impermeable seal isolating the unfiltered air flowing through the inlet 122 from the filtered air flowing from the outlet 126. Fluid flowing through the inlet 122 first passes through the portion 112 of the batt-like filter section which removes larger particles from the fluid flow. The fluid then flows through the pleats 116 of the pleated media 88 where the smaller particles are removed.

By way of illustration, but not by way of limiting the invention, there may be given the following example:

Using the apparatus of FIG. 2, an air laid batt is manufactured consisting of about 30 percent of fibers made from a vinyl polymer, known commercially as vinyon, and with the remainder wood pulp fibers. The batt is cut into sections, and is placed in the press 82 with a pleated media made from conventional pleated filtering paper. The die 94 is heated to a temperature of about 300° F. and pressed against the batt with a pressure of 1 ton for about 30 seconds. The press is then opened and the finished article is removed.

We claim:

1. Method of forming a fluid filter having first and second filtering media comprising the steps of forming said first filtering media by providing a nonwoven batt comprising a randomly arrayed mixture of thermoplastic material and fibers which are not thermoplastic, forming said second filtering media, cutting said batt into sections of sufficient size to provide an edge portion projecting beyond all sides of the second filtering media, placing said first filtering media on said second filtering media with the edge portion of the first filtering media projecting beyond all edges of the second filtering media, compressing said edge portion of the first filtering media against the edges of said second filtering media while causing said edge portion of the first filtering media to stiffen into a fluid-impermeable support portion for the edges of the second filtering media, and bonding the edges of the second filtering media to the fluid-impermeable support portion to effect a substantially fluid-impermeable seal therebetween, said step of causing said edge portions to stiffen being effected by heating and compressing said edge portion.

2. Method of forming a fluid filter as claimed in claim 1, including the step of forming a pleated filtering media as said second filtering media having longitudinally-spaced pleats before the first filtering media is placed on said second filtering media.

3. Method of forming a fluid filter as claimed in claim 2, wherein said second media is pleated filter paper and the step of bonding the edge portion of the first filtering media is effected by applying an adhesive between the edges of said second filtering media and said edge portion.

4. Method of forming a fluid filter as claimed in claim 2, wherein said second filtering media comprises a nonwoven mixture of thermoplastic fibers and fibers which are not thermoplastic, said step of bonding the edge portion of the batt section to the edge of said second filtering media being effected by fusing the fibers in the second filtering media with the fibers in the edge portion.

5. Method of forming a fluid filter as claimed in claim 1, wherein the edge portion is compressed by positioning the first filtering media over the second filtering media, and forcing a die against the marginal edge portion while leaving the rest of the batt free of pressure.

6. Method of forming a fluid filter as claimed in claim 5, including the step of heating the die to a temperature sufficiently great to at least partially melt said thermoplastic fibers to thereby stiffen that portion of the batt section engaged by the die.

7. Method of forming a fluid filter as claimed in claim 2, wherein a die defines an aperture to define a substantially ring-shaped structure for engaging the edge portion of said batt section while the remainder of said batt section is accommodated in said aperture in said die and is not engaged by the latter when said die is urged against said edge portion of the first filtering media.

8. Method of forming a fluid filter as claimed in claim 7, wherein said die has a pair of sides at substantially right angles to one another, one of said sides being forced against a first section of the edge portion of said second filtering media to force the latter against the edges of said pleats.

9. Method of forming a fluid filter as claimed in claim 8, wherein the other of said pair of sides engages a second section of said edge portion to stiffen said second portion sufficiently to form a gasket extending perimetrically around said first filtering media.

10. Method of forming a fluid filter as claimed in claim 9, including the step of heating said die to a temperature sufficiently great to at least partially melt said thermoplastic fibers to thereby stiffen that portion of the batt section engaged by said die.

11. Fluid filter element comprising a first filtering media including a fluid permeable batt of a nonwoven mixture of a thermoplastic material and fibers which are not thermoplastic, said batt having a main body portion and a marginal edge portion circumscribing said main body portion, said marginal edge portion comprising a stiffened wall projecting from said main body portion and circumscribing the latter to cooperate with the main body portion to define a recess, the thermoplastic material in said wall being fused with the fibers therein sufficiently such that said wall is substantially fluid impermeable, said wall surrounding the fluid-permeable main body portion, a second filter media received within said recess and having edges disposed adjacent said wall, and means providing a fluid-impermeable seal between the edges of said second filtering media and said wall.

12. Fluid filter element as claimed in claim 11, wherein said second filtering media is pleated filter paper, and said means providing a fluid-impermeable seal is an adhesive fastening the edges of the pleats to the wall.

13. Fluid filter element as claimed in claim 11, wherein said second filtering media is a pleated media consisting of a fluid-permeable mixture of thermoplastic fibers and fibers which are not thermoplastic and the means providing a fluid-impermeable seal includes fibers in said second media fused with fibers in said wall.

14. Fluid filter as claimed in claim 11, wherein said batt includes a gasket portion projecting from said wall and containing the thermoplastic fibers and fibers that are not thermoplastic contained in said batt, said fibers being fused sufficiently to be capable of providing a substantially fluid-impermeable seal but being sufficiently resilient to be able to sealingly engage with a filter housing.

* * * * *